United States Patent [19]

Astakhov et al.

[11] 4,168,725

[45] Sep. 25, 1979

[54] DEVICE FOR MEASURING FLOW RATE OF FLUID IN A PIPELINE

[76] Inventors: Valentin A. Astakhov, Flotskaya ulitsa, 16, kv. 92; Vladimir A. Podreshetnikov, Khalturinskaya ulitsa, 15, kv. 164; Viktor M. Plotnikov, Perekopskaya ulitsa, 17, korpus 3, kv. 37; Lev N. Teterevyatnikov, ulitsa Musorgskogo, 1, kv. 216, all of Moscow, U.S.S.R.

[21] Appl. No.: 804,250

[22] Filed: Jun. 7, 1977

[30] Foreign Application Priority Data

Jun. 14, 1976 [SU] U.S.S.R. .............................. 2363153

[51] Int. Cl.$^2$ ............................................. G01F 1/42
[52] U.S. Cl. ........................................ 138/44; 73/211
[58] Field of Search ........................ 138/44, 45, 108; 73/211, 278

[56] References Cited

U.S. PATENT DOCUMENTS

| | | | |
|---|---|---|---|
| 1,822,961 | 9/1931 | Emery | 138/44 |
| 1,845,722 | 2/1932 | Robinson | 138/44 |
| 2,127,501 | 8/1938 | Dall | 138/44 |
| 3,209,779 | 10/1965 | McGowen, Jr. | 138/44 |

*Primary Examiner*—Richard R. Stearns
*Attorney, Agent, or Firm*—Lackenbach, Lilling & Siegel

[57] ABSTRACT

The measuring portion of a pipeline comprises substantially the same pipe as that forming the mainline. A slot is longitudinally provided in the measuring portion thereof. An orifice plate is inserted into the measuring portion through the slot and is then turned so as to be arranged across the measuring portion. The slot is sealed by means of a special cap plate. Pressure is monitored upstream and downstream of the orifice plate to determine the pressure difference for calculation of the flow rate of the fluid in the pipeline.

5 Claims, 4 Drawing Figures

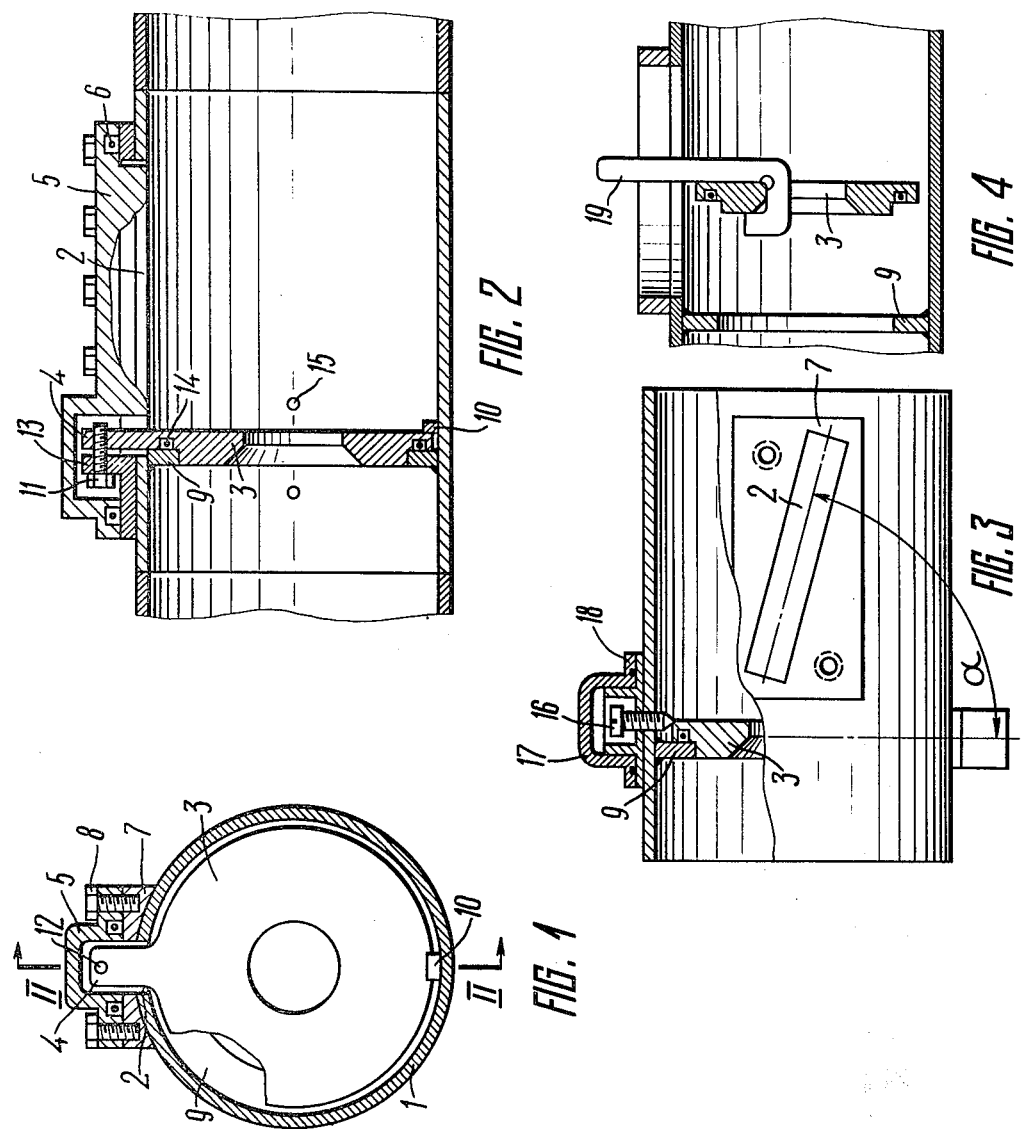

DEVICE FOR MEASURING FLOW RATE OF FLUID IN A PIPELINE

FIELD OF THE INVENTION

The present invention relates to measuring techniques, and, more particularly, to devices for measuring the flow rate of fluid in a pipeline, especially in those of large diameter.

DESCRIPTION OF THE PRIOR ART

At present, various devices for measuring the flow rate of a fluid are widely used which are based on the variable differential pressure. Usually, such a device comprises a measuring portion of a pipeline and an orifice plate placed across the fluid flow.

One of the most important problems associated with such devices is the insertion and removal of the orifice plate on from the measuring portion of pipeline.

Thus, there is known a device for measuring the flow rate of fluid which comprises a measuring portion of the pipeline having a slot extending across the pipeline and adapted for insertion of an orifice plate into the pipeline, the slot being arranged across the fluid flow in the pipeline. A holder is provided to maintain the orifice plate in the operative position, the holder being essentially a plane in the body of the device (cf. U.S. Pat. No. 1,958,854).

This device suffers from the following disadvantages.

The fact that the strength of the pipeline should remain unaffected requires that the wall thickness of the pipeline measuring portion be greatly increased or, at any rate, thicker than in other portions of the pipeline. This in turn complicates machining of the walls of the measuring portion and in some cases necessitates sectionalized construction, which renders the entire construction still more complicated and adds to the weight and the specific metal consumption.

Also, it is especially difficult to manufacture such devices for pipelines 700–1400 mm in diameter, which are mainly used for gas transports.

In addition, it should be born in mind that the use of the above-described device requires a special foundation to be provided in the zone of the orifice plate location in view of the heavy weight of the device.

SUMMARY OF THE INVENTION

It is a main object of the invention to provide the possibility of using pipes of the same external diameter as those used for the mainline in the measuring portion of a pipeline.

It is also an object of the invention to simplify the construction of a device for measuring the flow rate of fluid due to a new design of the measuring portion of a pipeline.

Another object of the invention is to reduce metal consumption for the manufacture of the device and to simplify the production process of the measuring portion of pipeline.

Elimination of the use of a special foundation is also among the objects of the invention.

These and other objects are accomplished by a device for measuring the flow rate of fluid in a pipeline using variable differential pressure which comprises a measuring portion of a pipeline having a slot; an orifice plate adapted to be inserted into the measuring portion of the pipeline through said slot and to be arranged across the measuring portion; and a rigidly fixed holder. According to the invention, the slot extends longitudinally of the measuring portion of the pipeline.

The invention is advantageous in that, while the provision of the slot extending longitudinally of the measuring portion of the pipeline still adversely affects the strength of the pipeline, the strength of the measuring portion can be maintained by welding a simple and lightweight frame-shaped cover plate onto the measuring portion of the pipeline. This is true on account of the fact that with such a construction of the device, the slot has a simpler shape as compared to the case where it is made across the pipeline in the form of an arc.

In addition, with the longitudinal arrangement of the slot, the length of the cut through the pipeline is approximately equal to the diameter of the orifice plate, whereas when the slot is arranged across the pipeline, the length of the cut through the pipeline along the generatrix line is 3.14/2D, that is about 1.5D, so that the length of the cut through the pipeline according to the invention is 1.5 times smaller. This feature permits the measuring portions to be made of pipes of the same external diameter as those used for the mainline with the result that the weight and cost of the device are materially lowered, and the treatment area is reduced, thus simplifying the manufacture.

Furthermore, since a simple cover plate may be used in the device according to the invention, as well as due to the fact that the same pipes are used in the construction of the measuring portion of pipeline and for the mainline, the cost of the measuring device as a whole is reduced.

Finally, the device for measuring the flow rate of fluid according to the invention is also advantageous in that the reduced metal consumption results in smaller construction and a reduction of the external surface area, thus preventing the orifice plate from overcooling in winter which leads to its freezing and impairs its measuring characteristics.

BRIEF DESCRIPTION OF THE DRAWINGS

The invention will now be described with reference to specific embodiments thereof illustrated in the accompanying drawings, in which:

FIG. 1 is a transverse sectional view of the measuring portion of pipeline with the orifice plate installed therein;

FIG. 2 is a cross-sectional view of the measuring portion taken along the line II—II in FIG. 1;

FIG. 3 is an outer or plan view of the pipeline showing the slot which is spaced apart from the orifice plate holder and extends at an angle to the axis of the measuring portion of the pipeline; and FIG. 4 is a longitudinal sectional view of the device of FIG. 3 showing a manipulator for removal of the orifice plate.

DETAILED DESCRIPTION OF THE INVENTION

Referring now to FIGS. 1 and 2, the wall 1 of the measuring portion of a pipeline has a slot 2 extending axially of the measuring portion of the pipeline, as best seen in FIG. 2. The measuring portion of the pipeline has the same external diameter as does the remaining portions of the pipeline.

An orifice plate 3 is positioned perpendicularly to the axis of the measuring portion of the pipeline within the measuring portion of the pipeline. The orifice plate 3 has a projecting part 4 extending through the slot 2 and adapted for turning the orifice plate in the pipeline and for removing its through the slot 2.

The slot 2 is closed by a cap plate 5 having a seal 6 (FIG. 2), e.g. in the form of a flexible rubber cord. For better sealing of the gap between the cap plate 5 and the wall 1, there is provided a metal cover plate 7 welded to the pipeline wall. The cover plate 7 also has a slot which is in alignment with the slot 2 of the measuring portion of the pipeline during installation of the cover plate.

The device could also be made without the cover plate 7; in such a case the cap plate 5 should directly adjoin the wall 1 of the measuring portion of the pipeline. This, however, would result in a more complicated shape of the mating surface between the cap plate 5 and the external side of the wall 1 of the measuring portion and also in difficulties encountered in sealing of the cap plate. When the cover plate 7 is used, the mating surface is planar.

Bolts 8 are provided for fixing the cap plate 5 to the measuring portion of the pipeline, the bolts pressing the cap plate 5 against the cover plate 7.

The orifice plate 3 is installed within the measuring portion of the pipeline and held in place by a holder 9 made in the form of a metal ring rigidly fixed to the measuring portion of the pipeline, e.g. by welding. For mounting the orifice plate 3 on the holder, there are provided a stop 10 and a bolt 11. A threaded hole 12 for bolt 11 is provided in the projecting part 4 of the orifice plate and the cover plate 7 has a lug 13 with a hole to receive the bolt. An annular seal 14 prevents fluid from bypassing the measuring opening of the orifice plate. Passages 15 for monitoring pressure are provided in the wall of the measuring portion of the pipeline to determine the pressure difference at this portion of the installation of the orifice plate.

The device for measuring the flow rate of fluid operates in the same manner as conventional devices of the type based on variable differential pressure.

The orifice plate 3 is mounted in the following manner. The bolts 8 are unscrewed and the cap plate 5 is removed. The orifice plate 3, which is kept at the projecting part 4, is inserted through the slot 2 until it abuts against the bottom part of the wall 1 of the measuring portion of the pipeline. Then the orifice plate 3 is turned 90° and its lower end engages the stop 10. Subsequently, the projecting part 4 is fixed by means of the bolt 11 to press the orifice plate 3 against the holder 9. The cap plate 5 is then mounted in place.

The orifice plate is removed for inspection or replacement in the following manner. The bolts 8 are unscrewed and the cap plate 5 is removed. Then, the bolt 11 is unscrewed and the orifice plate 3 is engaged at the projection part 4 and moved along the slot 2 until the lower part of the orifice plate 3 disengages the stop 10. Subsequently, the diaphragm is turned 90° to position it along the slot 2 and it is removed.

FIG. 3 shows an embodiment of the device for measuring flow rate of fluid wherein the slot 2 extends at an angle to the longitudinal axis of the measuring portion and is spaced apart from the holder 9. At any rate, the angle with respect to the longitudinal axis cannot be greater than 45° because, if it was, the slot would extend substantially across the pipeline with all the resulting negative consequences. The inclined positioning of the slot 2 which is spaced apart from the holder may prove preferable in fixing the holder with welds extending on either side thereof which may appear necessary for diminishing the holder deformations during welding.

The arrangement of the slot 2 at an angle to the axis of the measuring portion may also result in a smaller size of the cap plate 5 and the cover plate 7 with a low fluid pressure where, so that the cap plate may be fixed by means of two bolts. The orifice plate 3 is pressed against the holder 9 by means of a screw 16 having a conical tip received in the measuring portion of the pipeline, the screw head being outside. The screw 16 is sealed by means of a cap plate 17 having a seal 18. The orifice plate can be pressed against the holder by means of similar screws.

FIG. 4 shows a longitudinal section of the device of FIG. 3. As shown in FIG. 4, the orifice plate 3 is not provided with the projecting part 4, thus featuring a simpler structure. The removal and insertion of the orifice plate 3 are effected by means of a manipulator 19 which engages the orifice plate and turns it into the desired position during installation and removal.

The use of the device for measuring the flow rate of fluid, according to the invention, enables a considerable simplification of the construction thereof and a material savings in metal and improves the reliability.

What is claimed is:

1. A device for measuring flow rate of fluid in a pipeline using the principle of variable differential pressures comprising: a measuring portion of the pipeline having a longitudinal axis and having a slot extending at an angle less than 45° to said axis of said measuring portion, the external diameter of said measuring portion being equal to the external diameter of remaining portions of the pipeline; an orifice plate removably positioned perpendicularly to the axis of said measuring portion in said measuring portion and having an aperture in its center opening in the direction of said axis of said measuring portion; a holder rigidly mounted on said measuring portion for removably holding the orifice plate in said measuring portion perpendicularly to said axis of said measuring portion; and a cap plate with a seal for closing said slot secured to said measuring portion.

2. A device as claimed in claim 1, wherein said slot of said measuring portion is positioned parallel to said axis of said measuring portion.

3. A device as claimed in claim 1, wherein said measuring portion has a stop against which the orifice plate is positioned.

4. A device as claimed in claim 1, further comprising a manipulator engaging the orifice plate for rotating the orifice plate to positions for installing it in, and removing it from, the measuring portion.

5. A device for measuring flow rate of fluid in a pipeline using the principle of variable differential pressures, comprising: a measuring portion of the pipeline having a longitudinal axis and having a slot extending at an angle less than 45° to said axis of said measuring portion, the external diameter of said measuring portion being equal to the external diameter of remaining portions of the pipeline; an orifice plate removably positioned perpendicularly to the axis of said measuring portion in said measuring portion and having an aperture in its center opening in the direction of said axis of said measuring portion; a holder rigidly fixed to said measuring portion for removably holding the orifice plate in said measuring portion perpendicularly to said axis of said measuring portion; a cap plate with a seal for closing said slot secured to said measuring portion; and a cover plate disposed between said measuring portion and said cap plate and having a lug to which said orifice plate is secured.

* * * * *